(12) United States Patent
Barford

(10) Patent No.: US 7,356,443 B2
(45) Date of Patent: Apr. 8, 2008

(54) SYSTEMS AND METHODS FOR ANALYZING THE SELECTION OF MEASUREMENTS OF A COMMUNICATION NETWORK

(75) Inventor: Lee A. Barford, San Jose, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 470 days.

(21) Appl. No.: 10/738,145

(22) Filed: Dec. 17, 2003

(65) Prior Publication Data

US 2005/0138493 A1  Jun. 23, 2005

(51) Int. Cl.
*G06F 11/00* (2006.01)
*G06F 11/22* (2006.01)

(52) U.S. Cl. ............... 702/183; 370/232; 370/241; 370/244; 702/181; 714/33; 714/712

(58) Field of Classification Search ......... 702/133, 702/181, 182, 183, 190; 370/232, 241, 244, 370/252, 389; 374/102; 714/33, 712; 709/224
See application file for complete search history.

(56) References Cited

U.S. PATENT DOCUMENTS

| | | | | |
|---|---|---|---|---|
| 5,481,548 A | * | 1/1996 | Wallace | 714/712 |
| 5,684,807 A | * | 11/1997 | Bianchini et al. | 714/712 |
| 6,515,967 B1 | * | 2/2003 | Wei et al. | 370/244 |
| 6,834,256 B2 | * | 12/2004 | House et al. | 702/181 |
| 6,859,755 B2 | * | 2/2005 | Eryurek et al. | 702/183 |
| 2003/0103461 A1 | * | 6/2003 | Jorgenson | 370/241 |
| 2003/0159093 A1 | | 8/2003 | Manley et al. | |
| 2003/0177416 A1 | * | 9/2003 | Manley et al. | 714/33 |
| 2005/0068891 A1 | * | 3/2005 | Arsikere et al. | 370/232 |

FOREIGN PATENT DOCUMENTS

EP  1329734 A1  7/2003

OTHER PUBLICATIONS

U.S. Appl. No. 10/078,817, filed Feb. 19, 2002, Manley, Douglas R., et al.
European Search Report dated: Dec. 9, 2004.
European Search Report application No. EP04026614.

* cited by examiner

*Primary Examiner*—John Barlow
*Assistant Examiner*—John Le

(57) ABSTRACT

Representative embodiments are directed to systems and methods for analyzing the selection of measurements of events associated with a communications network. In one embodiment, the selection of measurements includes creating a representation of a network. After the creation of the network representation, multiple sets of contemplated measurements associated with the network representation are created. A metric is calculated that is related to the respective diagnostic effectiveness for each set of contemplated measurements when the respective set of contemplated measurements is provided to a network diagnostic algorithm.

22 Claims, 5 Drawing Sheets

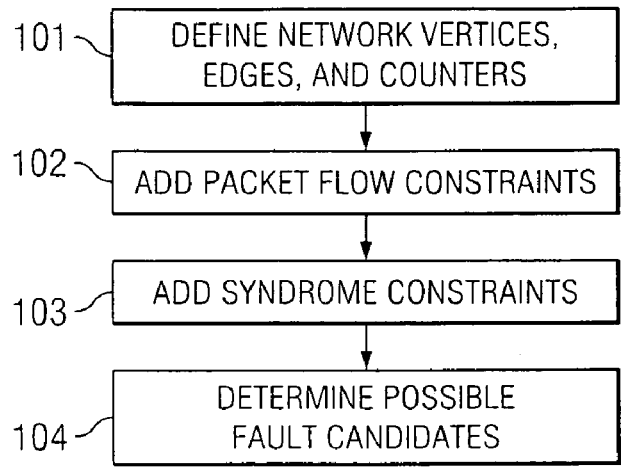
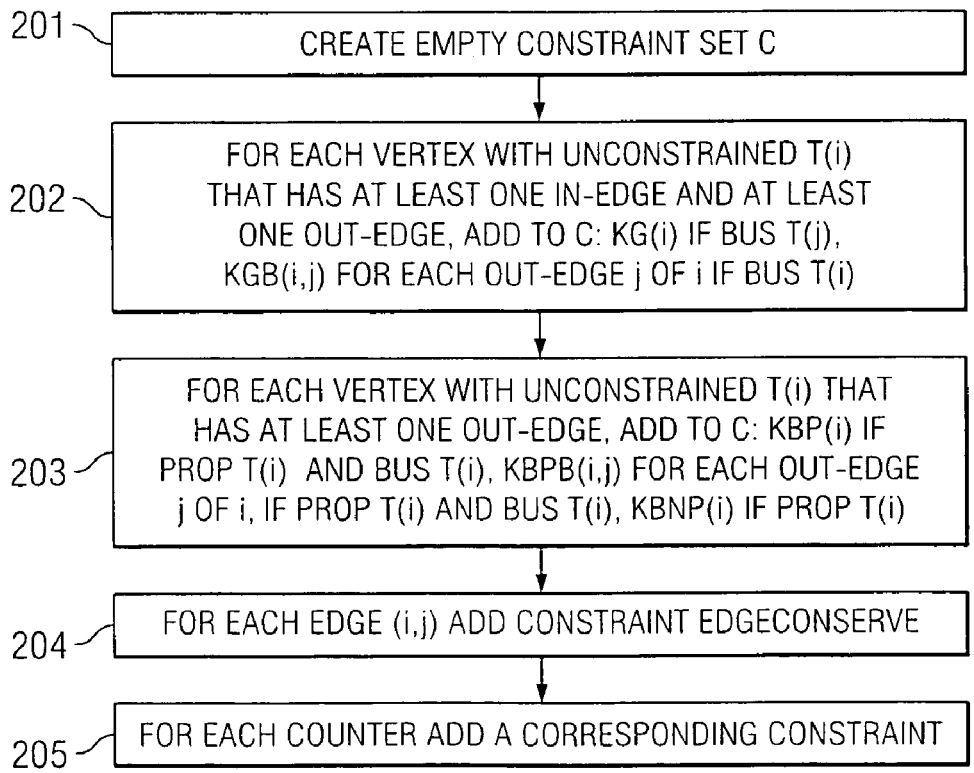

FIG. 3

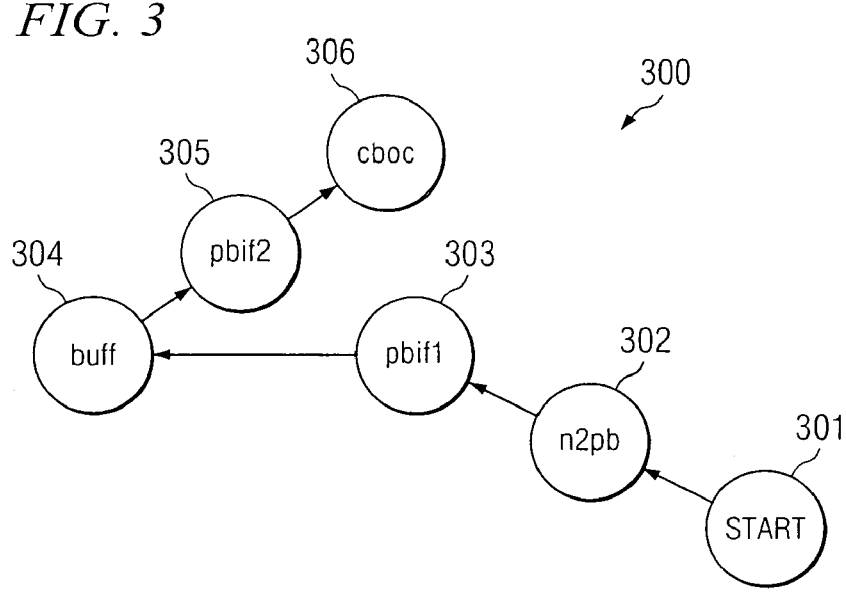

FIG. 4

```
g_start_n2pb - gd_start_n2pb - mb_start_n2pb - g_n2pb_pbif1 = 0;
  b_start_n2pb - bd_start_n2pb + mb_start_n2pb - b_n2pb_pbif1 = 0;
  g_n2pb_pbif1 - gd_n2pb_pbif1 - mb_n2pb_pbif - g_pbif1_buff = 0;
  b_pbif1_buff = 0;
  g_pbif1_buff - gd_pbif1_buff - mb_pbif_buff - g_buff_pbif2 = 0;
  b_pbif1_buff - bd_pbif1_buff + mb_pbif_buff - b_buff_pbif2 = 0;
  g_buff_pbif2 - gd_buff_pbif2 - mb_buff_pbif - g_pbif2_cboc = 0;
  b_pbif2_cboc = 0;
  gd_start_n2pb + mb_start_n2pb <= g_start_n2pb;
  bd_start_n2pb <= b_start_n2pb;
  gd_n2pb_pbif1 + mb_n2pb_pbif <= g_n2pb_pbif1;
  bd_n2pb_pbif1 <= b_n2pb_pbif1;
  gd_pbif1_buff + mb_pbif_buff <= g_pbif1_buff;
  bd_pbif1_buff <= b_pbif1_buff;
  gd_buff_pbif2 + mb_buff_pbif <= g_buff_pbif2;
  bd_biff_pbif2 <= b_buff1_pbif;
  g_start_n2pb = psi_1;
  g_start_n2pb - gd_start_n2pb - mb_start_n2pb = psi_2;
  g_n2pb_pbif1 - gd_n2pb_pbif1 - mb_n2pb_pbif +
            g_buff_pbif2 - gd_buff_pbif2 - mb_buff_pbif = psi_3;
  g_pbif2_cboc - gd_pbif2_cboc - mb_pbif_cboc = psi_4;
  g_pbif1_buff - gd_pbif1_buff - mb_pbif_buff = psi_5;
```

| FAULT HYPOTHESIS | SYN. 1 | SYN. 2 | SYN. 3 | SYN. 4 | SYN. 5 |
|---|---|---|---|---|---|
| edge start->n2pb | 1 | 0 | 0 | 0 | 0 |
| edge n2pb->pbif | 0 | 1 | 0 | 0 | 0 |
| edge pbif->buff | 0 | 0 | 1 | 1 | 0 |
| edge biff->pbif | 0 | 0 | 1 | 1 | 0 |
| edge pbif->cboc | 0 | 0 | 0 | 0 | 1 |

| FAULT HYPOTHESIS | SYN. 1 | SYN. 2 | SYN. 3 | SYN. 4 | SYN. 5 |
|---|---|---|---|---|---|
| edge start->n2pb | 1 | 0 | 0 | 0 | 0 |
| edge n2pb->pbif | 0 | 1 | 0 | 0 | 0 |
| edge pbif->buff | 0 | 0 | 1 | 0 | 0 |
| edge biff->pbif | 0 | 0 | 0 | 1 | 0 |
| edge pbif->cboc | 0 | 0 | 0 | 0 | 1 |

FIG. 8

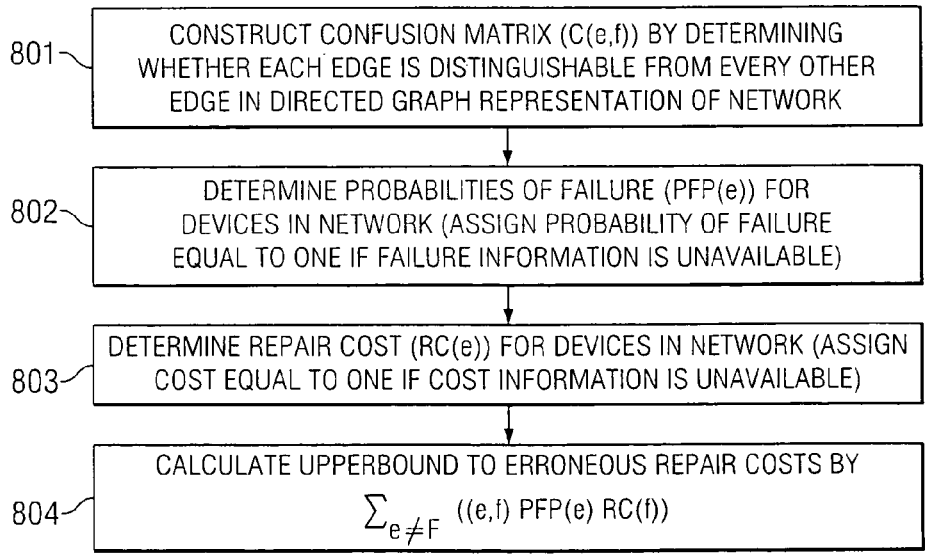

801 — CONSTRUCT CONFUSION MATRIX (C(e,f)) BY DETERMINING WHETHER EACH EDGE IS DISTINGUISHABLE FROM EVERY OTHER EDGE IN DIRECTED GRAPH REPRESENTATION OF NETWORK

802 — DETERMINE PROBABILITIES OF FAILURE (PFP(e)) FOR DEVICES IN NETWORK (ASSIGN PROBABILITY OF FAILURE EQUAL TO ONE IF FAILURE INFORMATION IS UNAVAILABLE)

803 — DETERMINE REPAIR COST (RC(e)) FOR DEVICES IN NETWORK (ASSIGN COST EQUAL TO ONE IF COST INFORMATION IS UNAVAILABLE)

804 — CALCULATE UPPERBOUND TO ERRONEOUS REPAIR COSTS BY $\sum_{e \neq F} ((e,f) \, PFP(e) \, RC(f))$

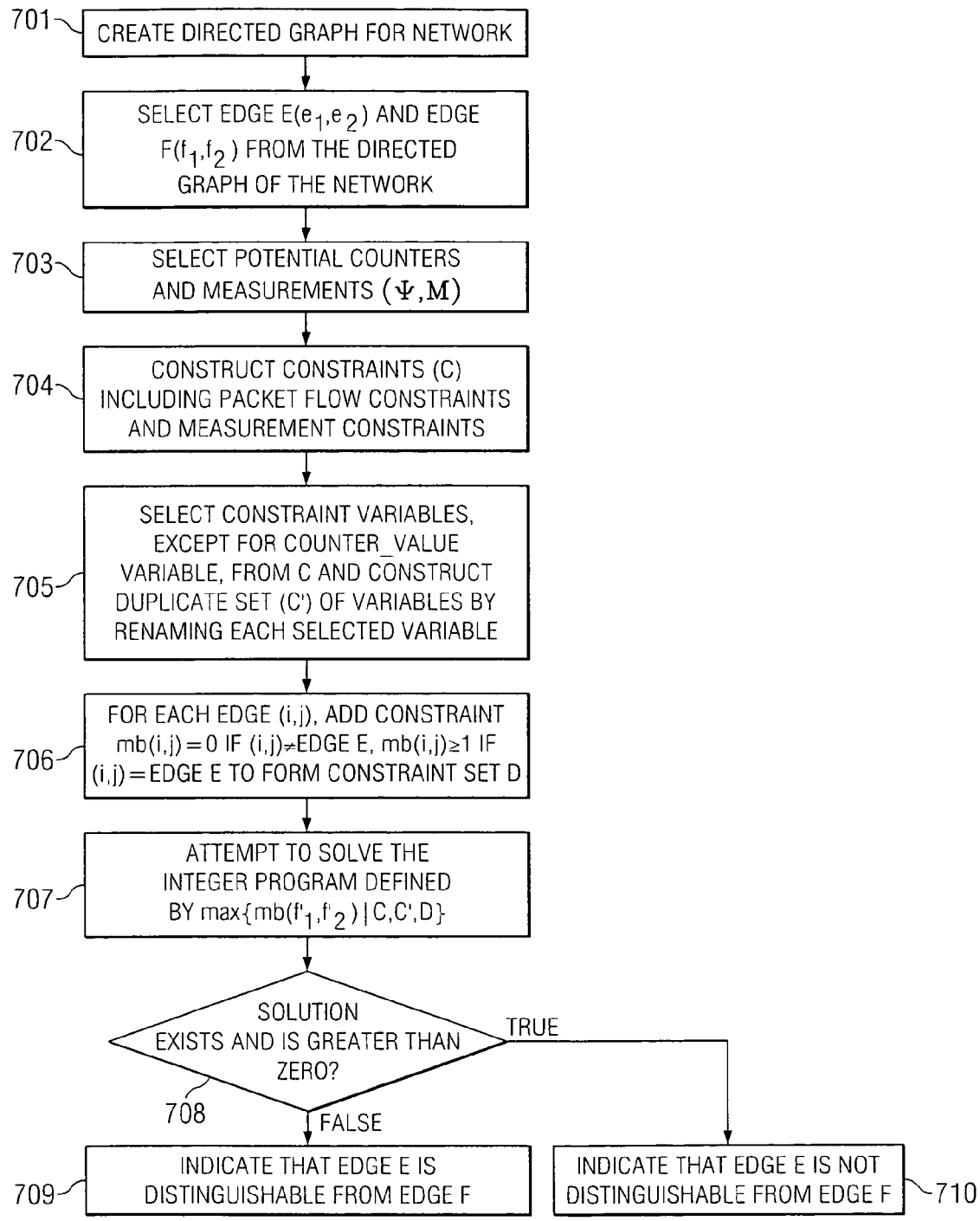

SYSTEMS AND METHODS FOR ANALYZING THE SELECTION OF MEASUREMENTS OF A COMMUNICATION NETWORK

TECHNICAL FIELD

The invention is related to communication network modeling, network measurements, and network diagnosis.

BACKGROUND

A number of applications exist that are used to facilitate management of a communications network. The applications typically gather measurements from a given network, process the measurements in some manner, and report the processed measurements to a user. Some applications attempt to diagnose a failure in a communications network by identifying one or several possible causes of the failure. However, applications that attempt to perform network diagnosis are limited by the measurements available. The measurements may be limited for any number of reasons. For example, network measurements may be limited to the pre-existing design of the network. Alternatively, it may be necessary to communicate the measurements from devices in the network to a particular processing system that performs the diagnosis. To prevent the communication from interfering with the ordinary operation of the network, it may be appropriate to only transmit a subset of available measurements to the processing system for the diagnosis function.

SUMMARY

Representative embodiments are directed to systems and methods for facilitating the selection of network measurements for diagnosis of a communications network. In one representative embodiment, an expression (e.g., a directed graph representation) of a network is generated. Contemplated sets of measurements are associated with selected elements of the expression of the network to identify the location and nature of the contemplated measurements. For each set of measurements, a metric is calculated that is related to the diagnostic accuracy of a diagnostic algorithm that processes the respective measurements. The metric may also possess a relationship to the probability of failure of devices within the network and/or the cost of repair of the devices.

In one embodiment, to facilitate the selection of measurements, an integer programming methodology is provided that determines whether a diagnosis algorithm is able to correctly distinguish between a first communication link and a second communication link as the corrupting link when the first communication link corrupts a packet. In the integer programming methodology, a communications network may be modeled in the form of a directed graph. From the network model, packet flow constraints may be defined. Counter constraints may be created according to a contemplated selection of measurements. Another constraint is defined that identifies a particular edge that corresponds to the first communications link as corrupting at least one packet. Other appropriate constraints are also defined to identify other edges as causing no packet corruption. From the set of constraints, an attempt is made to solve the defined integer program using a suitable method (such as the "Branch and Bound" method). If a solution is not found, the set of measurements is known to enable packet corruption caused by the first communication link to be distinguished from the second communication link. If a solution is found, it is known that packet corruption caused by the first communication link could be misdiagnosed as being caused by the second link.

Based upon the methodology to determine whether two communication links are "distinguishable," a confusion matrix may be built that identifies the relationship between each communication link in the network. Each element (e,f) of the matrix identifies whether the $e^{th}$ edge is distinguishable from the $f^{th}$ edge. The matrix enables improvement in the selection of measurements. Specifically, for each element (e, f) of the matrix that identifies an edge as being indistinguishable from another edge, an additional measurement can be selected to enable the two edges to be distinguished. Additionally, the matrix may facilitate the selection of measurements upon the basis of a priori information. For example, the matrix may be used in conjunction with the probability of failures of particular devices and the cost of repairs for the devices.

BRIEF DESCRIPTION OF THE DRAWINGS

FIG. 1 depicts a flowchart for performing network diagnosis using an integer programming methodology.

FIG. 2 depicts a flowchart for defining an integer program to facilitate network diagnosis.

FIG. 3 depicts a representation of a network to facilitate network diagnosis.

FIG. 4 depicts a set of constraints for an integer program using the network representation shown in FIG. 3.

FIG. 5 depicts a table of syndromes.

FIG. 6 depicts a table of results of the integer programs defined by the constraints shown in FIG. 4 and the syndromes shown in FIG. 5.

FIG. 7 depicts a flowchart for determining whether a first edge is distinguishable from a second edge according to an integer programming methodology.

FIG. 8 depicts a flowchart for calculating a metric for a contemplated set of measurements for network diagnosis.

DETAILED DESCRIPTION

Figure 9:
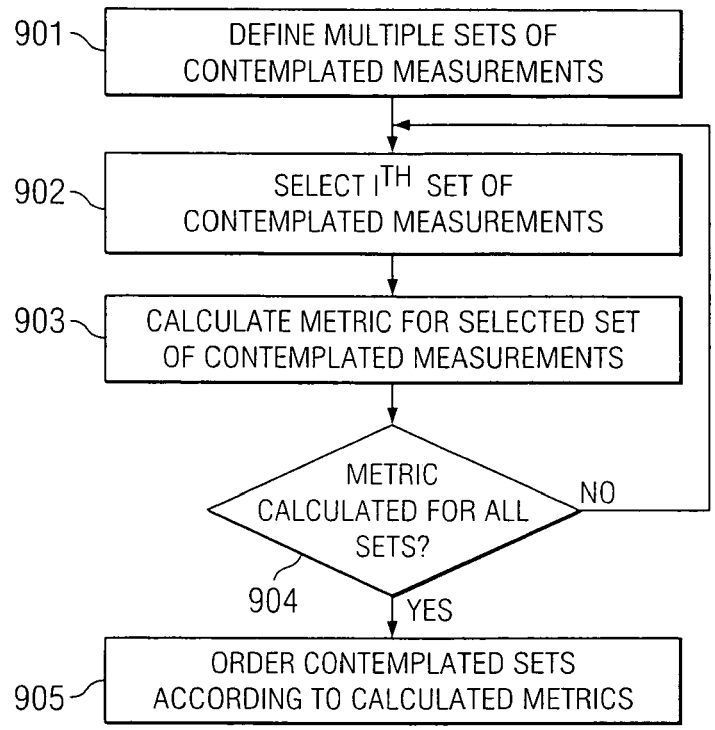
FIG. 9 depicts a flowchart for determining the relative diagnostic accuracy associated with multiple sets of contemplated measurements for a diagnostic algorithm.

Representative embodiments employ a diagnostic algorithm that analyzes observed faults (instances of packet corruption) in a network in view of a packet flow constraints associated with the network. Suitable diagnostic algorithms include relaxation methods, theorem proving algorithms, linear programming methods, search methods, and constraint satisfaction algorithms. One embodiment employs an integer programming methodology to diagnose failures in a network. The diagnosis algorithm is described in greater detail in co-pending and commonly assigned U.S. patent Ser. No. 10/078,817 entitled "Diagnosis of Data Transfer Faults Using Constraints," which is incorporated herein by reference. The details of the integer programming methodology shall be discussed with respect to FIGS. 1-6, before the discussion of the selection of network measurements occurs.

A suitable integer program may be defined by modeling the network in the form of a directed graph. For the purposes of this application, the term "network" may include any device or system capable of communicating packets. Thus, the term "network" may encompass devices that are ordinarily considered a sub-component of a network such as a router. The directed graph includes vertices that receive and/or transmit packets. The directed graph also includes edges between vertices that define the directions in which the packets may traverse the directed graph. Based upon the definition of the network via the directed graph, a set of packet constraints is developed. The packet constraints specify limitations of possible network measurements. When actual packet measurements are determined, the packet constraints and the measurements are encoded in a suitable form. An optimization algorithm (e.g., a suitable integer programming algorithm) is employed to determine possible fault candidates in view of the encoded packet constraints and measurements.

FIG. 1 depicts a flowchart for analyzing intermittent failures in a network according to one representative embodiment. In step 101, network vertices, edges, and counters are defined. In step 102, packet flow constraints are added to a linear program. In step 103, syndrome constraints are added to the linear program. Syndrome constraints refer to the measured data associated with an observed intermittent failure or failures. In step 104, possible fault candidates are determined by solving the integer program using a suitable method such as the "Branch and Bound" method. Each of these steps are discussed in greater detail below.

Specifically, the diagnosis of intermittent failures in a network may begin by creating a model of the network (see step 101 of FIG. 1). Some representative embodiments represent the network as a directed graph G=(V, E). A vertex $v \in V$ of G is a location within the network where (i) measurements may take place; (ii) the "goodness" or "badness" of packets may be tested (e.g., utilizing cyclic redundancy code (CRC) algorithms); and/or (iii) bad or corrupted packets may be dropped. Vertices are tagged with information related to the behavior characteristics. A vertex designated by "prop" propagates bad packets, designated by "nonprop" drops bad packets, or designated by "bus" propagates received good packets on all out-edges. A vertex designated by "unconstrained" refers to a vertex for which no knowledge is available concerning the relationship between the number of packets received and transmitted by the respective vertex. Let A={prop, unprop, bus, unconstrained} be the set of possible vertex tags. Each vertex $v \in V$ has an associated set of tags given by the function T: $V \rightarrow 2^A$.

The directed set of edges $E \subseteq V \times V$ are communication paths between vertices. Without loss of generality, only single direction edges (edges that communicate packets in one direction between respective vertices) are considered. That is, any physical edge that communicates packets bidirectionally is split into two single direction edges for the purpose of the network model. The edges $(j,i) \in E$ are called the in-edges of i and $(i,j) \in E$ are called the out-edges of i. Furthermore, it is assumed that a packet that flows in to any vertex v from any of v's in edges may flow out of any of v's out-edges. If a physical system is known to restrict the flow of packets that enter one of its vertices at a particular in-edge to exit from a particular out-edge or edges, the vertex may be split into multiple vertices for the purposes of the network model.

Additionally, the available network counters Ψ and a related map M of the counters are defined. The map M is given by: $E \times \{t,r\} \times \{good, bad\} \rightarrow \Psi$. The map M provides the semantics of the counters as follows:

suppose $M((i,j),t,good)=\psi$, then the counter is incremented whenever a good packet is transmitted from vertex i onto edge (i,j);

suppose $M((i,j),t,bad)=\psi$, then the counter is incremented whenever a bad packet is transmitted from vertex i onto edge (i,j);

suppose $M((i,j),r,good)=\psi$, then the counter is incremented whenever a good packet is received by vertex i via edge (i,j);

suppose $M((i,j),r,bad)=\psi$, then the counter is incremented whenever a bad packet is received by vertex i via edge (i,j);

The map M may be onto one-to-one but may not be one-to-one, i.e., multiple counter semantics may be mapped to the same counter. For example, suppose a vertex v has three in-edges (x,v), (y,v), and (z,v). The counter ψ may count all good packets arriving at v:

After developing a model of a network utilizing vertices, edges, and counters, the constraints on the network can be identified. The identified constraints (e.g., the packet flow, the counter semantics, and/or the like and the measured counter values) are encoded into an optimization problem whose optimal solution determines whether a particular edge can be faulty. The diagnosis algorithm includes three subsections: extracting flow constraints, adding syndrome constraints, and determining fault candidates. The first subsection (extracting flow constraints) may be performed or precomputed for a given network. Only the second and third subsections are re-iterated for each syndrome.

Some representative embodiments employ the following set of variables:

$U_{(i,j) \in E}\{g(i, j), b(i, j), mb(i, j), gd(i, j), bd(i, j)\}$.

In the set of variables, the variable g(i,j) represents the number of good packets transmitted on edge (i,j) and the variable b(i,j) represents the number of bad packets transmitted on edge (i,j). The variable mb(i,j) represents the number of packets made bad on edge (i,j) (packets transmitted as good but received as bad). The variable gd(i,j) represents the number of good packets transmitted on edge (i,j) that disappeared. Specifically, it is possible that a packet may experience sufficient corruption that the receiving device cannot identify it as a packet. The variable bd(i,j) represents the number of bad packets transmitted on edge (i,j) that disappeared.

Some representative embodiments utilize "Kirchoff-like" constraints to analyze the propagation of packets through a network. As known in the art of circuit theory, Kirchoff laws constrain current flow in a circuit according to the physical law of conservation of current (i.e., charge can be neither created or destroyed within a circuit). However, Kirchoff laws cannot be applied on a one-to-one basis to network analysis, because there is no analogy in the packet flow of a network to the physical law of conservation of charge. Accordingly, representative embodiments generate Kirchoff-like constraints to adapt the possibility of packet creation and destruction in a network as will be discussed in greater detail below.

The extraction of flow constraints, as briefly discussed with respect to step 102 of FIG. 1, may be formalized as shown in FIG. 2 according to one representative embodiment. An initial empty set C of constraints is created (step 201). In step 202, for each vertex i with unconstrained $\notin T(i)$ that has at least one in-edge and at least one out-edge, add to C: "KG(i)" if bus $\notin T(j)$ and "KGB(i,j)" for each out-edge j of i if bus $\in T(i)$.

The Kirchoff-like constraint KG(i) is defined as follows:

$$\sum_{(k,i)\in E} g(k, i) - \sum_{(k,i)\in E} gd(k, i) - \sum_{(k,i)\in E} mb(k, i) - \sum_{(i,j)\in E} g(i, j) = 0$$

The constraint KG(i) states that the number of good packets transmitted to vertex i less than number of packets that disappeared on i's in-edges and less the number of packets made bad within i's in-edges equals the number of good packets flowing out of i's out-edges.

The Kirchoff-like constraint KGB(i,j) is defined as follows:

$$\sum_{(k,i)\in E} g(k, i) - \sum_{(k,i)\in E} gd(k, i) - \sum_{(k,i)\in E} mb(k, i) - g(i, j) = 0.$$

The constraint KGB(i,j) states that the number of good packets transmitted to vertex i less the number of packets that disappeared on i's in-edges and less the number of packets made bad with i's in-edges equals the number of good packets flowing out of out-edge j of i.

In step 203, for each vertex with unconstrained $\epsilon$ T(i) that has at least one out-edge, add to C: KBP(i) if prop $\epsilon$ T(i) and bus o T(i); KBPB(i,j) for each out-edge j of i if prop $\epsilon$ T(i) and bus $\epsilon$ T(i); and KBNP(i) if prop $\notin$ T(i).

The constraint KBP(i) is defined as follows:

$$\sum_{(k,i)\in E} b(k, i) - \sum_{(k,i)\in E} bd(k, i) - \sum_{(k,i)\in E} mb(k, i) - \sum_{(i,j)\in E} b(i, j) = 0.$$

The constraint KBP(i) states that, for a vertex having the prop property, the number of bad packets transmitted to i less the number of packets that disappeared on i's in-edges plus the number of packets made bad within i's in-edges equals the number of bad packets flowing out of i.

The constraint KBPB(i,j) is defined as follows:

$$\sum_{(k,i)\in E} b(k, i) - \sum_{(k,i)\in E} bd(k, i) - \sum_{(k,i)\in E} mb(k, i) - b(i, j) = 0.$$

The constraint KBPB(i,j) states that for a vertex that has the prop and bus properties, the number of bad packets transmitted to i less the number of packets that disappeared on i's in-edges plus the number of packets made bad within i's in-edges equals the number of bad packets flowing out of each out-edge j of i.

The constraint KBNP(i) is defined as follows:

$$\sum_{(i,j)\in E} b(i, j) = 0.$$

The constraint KBNP(i) states that for a vertex with the nonprop property, no bad packets are transmitted.

In step 204, for each edge (i,j) add constraint EDGECONSERVE. The constraint EDGECONSERVE is defined as follows: gd(i,j)+mb(i,j)$\leq$g(i,j) and bd(i,j)$\leq$b(i,j). These two inequalities state that no more packets can disappear or be made bad on an edge than were transmitted on the edge.

In step 205, the counter constraints are added:

counter_value($\psi$)=$\Sigma_{M((i,j),\ t,\ good)=\psi}\ g(i,j)$+
$\Sigma_{M((i,j),\ r,\ good)=\psi}(g(i,j)-gd(i,j)-mb(i,j))$+
$\Sigma_{M((i,j),\ t,\ good)=\psi}\ b(i,j)+\Sigma_{M((i,j),r,\ bad)=\psi}((b(i,j)-bd(i,j)+mb(i,j))$.

Further, it is noted that all variables are constrained to be non-negative.

As previously discussed after adding the packet flow constraints, the syndrome constraints are added (see step 103 of FIG. 1). The syndrome constraints are the measured values of the various counters in the network. For each counter, a constraint is added to the linear program to specify the measured value of the counter.

After the syndrome constraints are added, the diagnosis problem is characterized by attempting to identify which fault candidates could have possibly caused the bad packets. Each fault candidate may correspond to exactly one edge (i,j) $\epsilon$ E. Each candidate has a corresponding variable mb(i,j). A fault candidate is identified if and only if there is a solution to the constraints where the fault candidate caused at least one bad packet. So, an edge (i,j) can be faulty if and only if max $\{mb(i,j)|C,S\}\geq 1$. The constraints are all linear. Also, the variable values are all integers. Therefore, the maximization problem is an integer programming (IP) problem. The known "Branch and Bound" method may be used to solve IP problems constructed according to representative embodiments. Also, a number of existing library routines are available for solving IP problems. The utility "lp_solve" (publicly available from ftp://ftp.es.ele.tue.n1/pub/lp_solve) may be used for this purpose.

To illustrate network diagnosis using an integer program methodology, FIG. 3 depicts network 300 that includes vertices 301-306. It is assumed that vertex 301 ("start") counts good packets transmitted and that vertices 302, 303, 305, and 306 ("n2pb," "pbif1," "pbif2," and "cboc" respectively) each count good packets received. The packet flow is constrained to require packets to flow from vertex 301 ("start"), to vertex 302 ("n2pb"), to vertex 303 ("pbif1"), to vertex 304 ("buff"), to vertex 305 ("pbif2"), and to vertex 306 ("cboc"). Vertices 303 and 305 represent the same physical device in network 300. The same physical device is represented in two vertices to reflect the constrained packet flow in network 300. If either vertex 303 or vertex 305 is found to have corrupted packets, the same physical device is reported to the user as the identified source of the fault.

The map defining the counter semantics is as follows:
M((start,n2pb),t,good)=$\psi_1$,
M((start,n2pb),r,good)=$\psi_2$,
M((n2pb,pbif1),r,good)=M((buff,pbif2),r,good)=$\psi_3$.
M((pbif2,cboc),r,good)=$\psi_4$, The counter $\psi_3$ is increased whenever a good packet is received by either vertex 303 and 305, since vertices 303 and 305 refer to the same physical device.

Using the network packet flow and the defined counters, constraints 400 shown in FIG. 4 may be derived according to representative embodiments. FIG. 5 depicts table 500 of syndromes to define a plurality of integer programs corresponding to network 300. FIG. 6 depicts table 600 of the results of the solutions of the integer programs defined by constraints 400 and the respective syndromes. Additionally, another counter could be added to network 300 for node 304 ("buff"). The additional counter may count the receipt of good packets (M((pbif1,buff),r,good)=$\psi_5$). Table 500 also includes syndromes for this additional counter. Table 600 also depicts the results of the solutions of the integer programs defined by constraints 400 and the syndromes corresponding to the additional counter.

The example results of the integer programs illustrate that different amounts of diagnostic accuracy can be achieved depending on the measurements of the system that are available for analysis. Representative embodiments use the observed difference in diagnosability based upon differences in network measurements to facilitate the selection of network measurements.

In one embodiment, diagnosability is analyzed by determining whether edges are "distinguishable." An edge e will be called distinguishable from edge f if and only if whenever edge e has corrupted at least one packet and no other edge has done so, it is impossible for f to be a diagnosis under $\Psi$ and M. FIG. 7 depicts a flowchart for determining whether a first edge is distinguishable from a second edge according to an integer programming diagnosis algorithm. In step 701, a directed graph for the network is constructed in the same manner as previously discussed. In step 702, a first edge E ($e_1$, $e_2$) and a second edge F ($f_1$, $f_2$) are selected from the directed graph of the network. In step 703, potential counters and measurements ($\Psi$ and M) are selected. In step 704, constraints (C) are constructed including packet flow constraints and measurement constraints as discussed above with respect to steps 202-205 of FIG. 2.

In step 705, each constraint in C, except counter_value($\Psi$) constraints, is selected to create a new corresponding constraint to duplicate the network model embodied in the constraints C. The duplication of the network model may occur by selecting each appropriate constraint in C and creating a new constraint by renaming the respective variable in the integer program using a suitable notation. The set of duplicate constraints is referred to by the set C'. The duplicate model C' is unconstrained by counter_value($\Psi$) constraints.

In step 706, for each edge (i,j) in the original network model (C), a constraint is added to form constraint set D. If the edge (i,j)=EDGE E in the original network model (C), the constraint mb(i,j)$\geq$1 is added. If the edge (i,j)$\neq$EDGE E in the original network model (C), the constraint mb(i,j)=0 is added.

In step 707, an attempt to solve the integer program defined by max $\{mb(f'_1, f'_2)|C,C',D\}$ occurs. The edge ($f'_1$, $f'_2$) refers to the edge in the duplicate model of the network that corresponds to selected edge F in the original model of the network. Because the duplicate model C' is unconstrained by counter_value($\Psi$) constraints, the attempt to solve the integer program attempts to determine whether any set of counter values exists that indicates that edge ($f'_1$, $f'_2$) has caused at least one instance of packet corruption. Additionally, because the constraints in C' duplicate the constraints in C and constraints related to packet corruption have been created for the constraints in C, a solution to the defined integer program will only find packet corruption on the edge ($f'_1$, $f'_2$) when edges E and F are not distinguishable.

In step 708, a logical determination is made to determine whether a solution to the integer program exists that is greater than zero. If the logical determination is false, the process flow proceeds from step 708 to step 709 where an indication is made that edge E is distinguishable from edge F. If the logical determination of step 708 is true, the process flow proceeds to step 710 where an indication is made that edge E is not distinguishable from edge F.

FIG. 8 depicts a flowchart for calculating a metric that evaluates the effectiveness of selecting measurements for network diagnosis using a confusion matrix. In step 801, a confusion matrix (C) is constructed by determining whether each edge is distinguishable from every other edge in a directed graph representation of a network. Each element (e, f) in the matrix identifies whether the $e^{th}$ edge is distinguishable from the $f^{th}$ edge. The matrix may be defined so that when an element equals zero, the $e^{th}$ edge is distinguishable from the $f^{th}$ edge. If an element equals one, the $e^{th}$ edge is not distinguishable from the $f^{th}$ edge.

In step 802, the probabilities of failures (PFP(e)) for devices corresponding to each edge are determined. If the information related to failures is unavailable, each PFP(e) may be assigned a value of one. In step 803, the costs of repair (RC(e)) for devices corresponding to each edge are determined. If the information related to cost of repair is unavailable, each RC(e) may be assigned a value of one. In step 804, an upper bound to the cost of erroneous repairs is calculated by $\Sigma_{e \neq f} C(e, f) PFP(e) RC(f)$. Specifically, each element (e,f) of the confusion matrix identifies whether an error caused by the edge e could be confused by an integer program diagnosis algorithm as being caused by edge f. By summing the multiple of the element of the confusion matrix, the probability of failure, and the cost of repair of the incorrect device across each edge in the network, the upper bound is determined.

FIG. 9 depicts a flowchart for analyzing the relatively diagnostic effectiveness of multiple sets of contemplated measurements for a network diagnostic algorithm. In step 901, multiple sets of contemplated measurements ($\Psi_i$ and $M_i$) are defined. In step 902, the $i^{th}$ set of contemplated measurements is selected. The step 903, the suitable metric (e.g., the metric defined by the flowchart shown in FIG. 8) that is related to diagnostic effectiveness of the set is calculated. In step 904, a logical determination is made to determine whether a metric has been calculated for each set of contemplated measurements. If not, the process flow returns to step 902. If a metric has been calculated for each set, the process flow proceeds to step 905. In step 905, the contemplated sets of measurements may be ordered according to the relative degrees of diagnostic effectiveness using the calculated metrics for presentation to a user.

Figure 10:
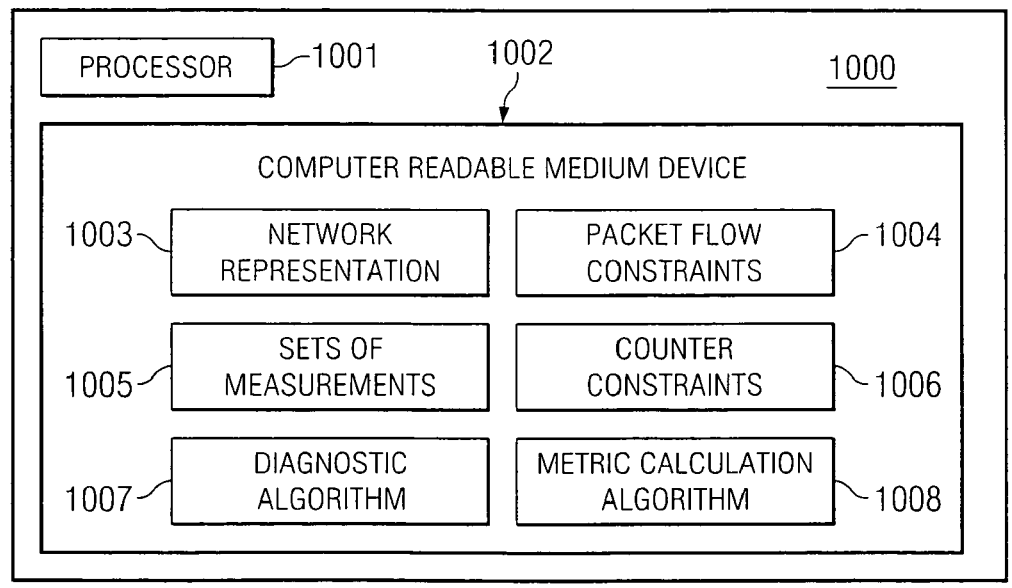
FIG. 10 depicts a system for analyzing contemplated network measurements.

FIG. 10 depicts computer system 1000 adapted to implement representative embodiments. Computer system 1000 includes general purpose processor 1001 that is operated under the control of suitable executable instructions. Executable instructions or code may be used to define the diagnostic process flows previously discussed. The executable instructions and related data structures may be stored in computer readable memory that is accessible by computer readable memory device 1002. Computer readable memory device 1002 may be implemented using any number of suitable storage devices such as a hard disk drive. Network representation 1003, packet flow constraints 104, sets of measurements 1005, counter constraints 1006, and other suitable data structures may be stored on the computer readable medium. Diagnostic algorithm 1007 may perform network diagnosis according to network representation 1003. Metric calculation algorithm 1008 may calculate a metric for each set in sets of measurements 1005 to determine the respective diagnostic effectiveness in view of diagnostic algorithm 1007.

Although embodiments have been described that employ integer programming techniques, other suitable algorithms may be used to analyze the effectiveness of a diagnostic algorithm. Suitable algorithms include relaxation methods, theorem proving algorithms, linear programming methods, search methods, and constraint satisfaction algorithms. Additionally, network representations used by such algorithms may be embodied using a variety of structures. Suitable structures include "tree-like" data structures, adjacencies or other suitable matrices, logical assertions encoded using suitable programming languages, and/or the like.

Some representative embodiments may provide a number of advantages. Some representative embodiments enable measurements for a network diagnosis algorithm to be selected to optimize the effectiveness of the diagnosis algorithm. Some representative embodiments identify edges that could be confused as the source of a fault to facilitate the selection of measurements. Upon the basis of such identification, additional measurements may be selected. Additionally, when multiple sets of measurements are contemplated, a metric may be calculated to compare the relative effectiveness of the measurements when processed by a diagnostic algorithm.

What is claimed is:

1. A method, comprising:
 a modeling an existing network to create a representation of said network;
 creating multiple sets of contemplated measurements associated with said representation of said network; and
 calculating a metric that is related to a respective diagnostic effectiveness for each set of contemplated measurements when said respective set of contemplated measurements is provided to a network diagnostic algorithm;
 wherein said calculating a metric comprises determining whether packet corruption caused by a first communication link in said network could be misdiagnosed by said network diagnostic algorithm as being caused by a second communication link.

2. The method of claim 1 wherein said calculating a metric comprises:
 building a matrix whether identifying packet corruption caused by each respective communication link in said network is distinguishable from packet corruption caused by every other communication link in said network.

3. The method of claim 1 wherein said calculating a metric uses probabilities of failure of devices in said network.

4. The method of claim 1 wherein said calculating a metric uses costs of repair of devices in said network.

5. A method, comprising:
 selecting a first edge in a network representation of a network;
 defining packet flow constraints corresponding to said network representation and counter constraints corresponding to network measurements;
 defining packet corruption constraints that include a constraint identifying said first edge as causing at least one instance of packet corruption;
 attempting to solve an integer program, that uses said packet flow constraints, counter constraints, and packet corruption constraints, for packet corruption on a second edge in said network representation;
 in response to said attempting, determining whether packet corruption caused by said first edge is distinguishable from packet corruption caused by said second edge, wherein said determining is used to facilitate management of the network.

6. The method of claim 5 wherein said packet flow constraints include a first set of packet flow constraints corresponding to network routing limitations and a second set of said packet flow constraints that are duplicates of said first set.

7. The method of claim 6 wherein said duplicates of said first set are unconstrained by packet counter constraints.

8. The method of claim 5 wherein said packet corruption constraints include constraints identifying edges other than said first edge as causing zero instances of packet corruption.

9. The method of claim 5 further comprising:
 determining whether a solution for said integer program exists for packet corruption on said second edge that is greater than zero.

10. The method of claim 5 further comprising:
 generating a matrix defining whether packet corruption for each edge in said network representation is distinguishable from packet corruption on every other edge in said network representation.

11. The method of claim 10 further comprising:
 determining a set of measurements that minimizes a cost of erroneous repairs using said matrix, probabilities of failures of devices associated with edges in said network representation, and costs of repair for said devices.

12. The method of claim 11 further comprising:
 defining said probabilities of failures to equal one.

13. The method of claim 11 further comprising:
 defining said costs of repairs to equal one.

14. A computer program product having a computer readable medium having computer program logic recorded thereon for managing a network, the computer program product, comprising:
 a first data structure for representing a network;
 a second data structure for representing packet flow constraints associated with said network;
 a third data structure for representing sets of contemplated measurements;
 code for defining a network diagnostic algorithm that identifies potential fault candidates using said first second, and third data structures; and
 code for calculating a metric, for each set of contemplated measurements, that is related to a respective diagnostic effectiveness of a set of contemplated measurements when processed by said network diagnostic algorithm, wherein the metric is used to facilitate management of the network.

15. The computer program product of claim 14, wherein said network diagnostic algorithm applies an integer programming solution algorithm to constraints defined by said second data structure and said third data structure.

16. The computer program product of claim 14 wherein said code for calculating a metric determines whether each edge is distinguishable from every other edge in said first data structure when a respective set of contemplated measurements is processed by said network diagnostic algorithm.

17. The computer program product of claim 14 wherein said metric is further related to probabilities of failure associated with devices within said network.

18. The computer program product of claim 14 wherein said metric is further related to costs of repair of devices within said network.

19. A system comprising:
means for representing an existing network;
means for representing at least one set of measurements associated with said network; and
means for determining whether a diagnostic algorithm uniquely identifies a first edge in said means for representing as a source of packet corruption when said first edge has caused packet corruption when said diagnostic algorithm processes said set of measurements, and wherein said means for determining generates a data structure that defines whether each edge in said means for representing is distinguishable as a source of packet corruption from every other edge in said means for representing.

20. The system of claim 19 further comprising:
means for calculating a metric for said set of measurements that is related to diagnostic effectiveness of said set of measurements when processed by said diagnostic algorithm.

21. The system of claim 20 wherein said metric is further related to probabilities of failure of devices within said network.

22. The system of claim 20 wherein said metric is further related to costs of repair of devices within said network.

* * * * *